US012292527B2

(12) United States Patent
Rich et al.

(10) Patent No.: US 12,292,527 B2
(45) Date of Patent: May 6, 2025

(54) INTEGRATED APPARATUS AND METHOD TO COMBINE A WIRELESS FENCE COLLAR WITH GPS TRACKING CAPABILITY

(71) Applicant: Radio Systems Corporation, Knoxville, TN (US)

(72) Inventors: Christopher Rich, Knoxville, TN (US); Andrew Beck, Knoxville, TN (US); Gary Roulston, Knoxville, TN (US); Andrew Angellotti, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 1495 days.

(21) Appl. No.: 16/708,077

(22) Filed: Dec. 9, 2019

(65) Prior Publication Data
US 2020/0182961 A1    Jun. 11, 2020

Related U.S. Application Data

(63) Continuation of application No. 16/253,708, filed on Jan. 22, 2019, now abandoned, which is a
(Continued)

(51) Int. Cl.
*G01S 5/14*    (2006.01)
*A01K 11/00*    (2006.01)
(Continued)

(52) U.S. Cl.
CPC .............. *G01S 5/14* (2013.01); *A01K 11/008* (2013.01); *A01K 15/023* (2013.01);
(Continued)

(58) Field of Classification Search
CPC . G01S 5/14; G01S 19/14; G01S 19/16; G01S 19/34; A01K 15/023; A01K 11/008;
(Continued)

(56) References Cited

U.S. PATENT DOCUMENTS 2,364,994 A    12/1944    Moore
2,741,224 A    4/1956    Putnam
(Continued)

FOREIGN PATENT DOCUMENTS

CN    101937015 A    1/2011
CN    101112181 B    11/2012
(Continued)

OTHER PUBLICATIONS

Ayele E., et al., "Highly Energy Efficient Animal Mobility Driven BLE Beacon Advertising Control for Wildlife Monitoring," IEEE Xplore, 2020, 8 pages.
(Continued)

*Primary Examiner* — Curtis B Odom
(74) *Attorney, Agent, or Firm* — Baker, Donelson, Bearman, Caldwell & Berkowitz, PC

(57) ABSTRACT

An integrated apparatus and method is provided for a collar that is configured to operate as part of a wireless fence system that contains and monitors the location of a dog within containment area defined by the wireless fence system and further configured to provide GPS tracking capability when the dog has escaped from the containment area. As long as the dog remains in the area defined by the wireless fence, the collar operates solely in a wireless fence mode, communicating with the transmitters used as part of the wireless fence system. The GPS tracking function remains "asleep" and is not activated unless and until the dog escapes. Once GPS mode is activated, fence mode is shut down and operation of the GPS enables the dog owner
(Continued)

or other individual to receive SMS messages and/or email with information on the dog's location on a smart-phone, tablet or PC.

29 Claims, 8 Drawing Sheets

Related U.S. Application Data continuation of application No. 14/200,362, filed on Mar. 7, 2014, now Pat. No. 10,228,447.

(60) Provisional application No. 61/788,559, filed on Mar. 15, 2013.

(51) Int. Cl.
| | |
|---|---|
| A01K 15/02 | (2006.01) |
| A01K 27/00 | (2006.01) |
| G01S 19/14 | (2010.01) |
| G01S 19/16 | (2010.01) |
| G01S 19/34 | (2010.01) |
| G08B 21/02 | (2006.01) |

(52) U.S. Cl.
CPC ............ *A01K 27/009* (2013.01); *G01S 19/14* (2013.01); *G01S 19/16* (2013.01); *G01S 19/34* (2013.01); *G08B 21/0261* (2013.01); *G08B 21/0269* (2013.01)

(58) Field of Classification Search
CPC .............. A01K 27/009; G08B 21/0261; G08B 21/0269
See application file for complete search history.

(56) References Cited

U.S. PATENT DOCUMENTS

| | | | |
|---|---|---|---|
| 3,182,211 A | 5/1965 | Maratuech et al. | |
| 3,184,730 A | 5/1965 | Robert | |
| 3,500,373 A | 3/1970 | Arthur | |
| 3,735,757 A | 5/1973 | MacFarland | |
| 4,180,013 A | 12/1979 | Smith | |
| 4,335,682 A | 6/1982 | Gonda et al. | |
| 4,426,884 A | 1/1984 | Polchaninoff | |
| 4,783,646 A | 11/1988 | Matsuzaki | |
| 4,794,402 A | 12/1988 | Gonda et al. | |
| 4,802,482 A | 2/1989 | Gonda et al. | |
| 4,947,795 A | 8/1990 | Farkas | |
| 4,969,418 A | 11/1990 | Jones | |
| 5,054,428 A | 10/1991 | Farkus | |
| 5,159,580 A | 10/1992 | Andersen et al. | |
| 5,161,485 A | 11/1992 | McDade | |
| 5,182,032 A | 1/1993 | Dickie et al. | |
| 5,207,178 A | 5/1993 | McDade et al. | |
| 5,207,179 A | 5/1993 | Arthur et al. | |
| 5,471,954 A | 12/1995 | Gonda et al. | |
| 5,526,006 A | 6/1996 | Akahane et al. | |
| 5,559,498 A | 9/1996 | Westrick et al. | |
| 5,576,972 A | 11/1996 | Harrison | |
| 5,586,521 A | 12/1996 | Kelley | |
| 5,601,054 A | 2/1997 | So | |
| 5,610,588 A | 3/1997 | Yarnall, Jr. | |
| 5,642,690 A | 7/1997 | Calabrese et al. | |
| 5,749,324 A | 5/1998 | Moore | |
| 5,794,569 A | 8/1998 | Titus et al. | |
| 5,810,747 A | 9/1998 | Brudny et al. | |
| 5,815,077 A | 9/1998 | Christiansen | |
| 5,844,489 A | 12/1998 | Yarnall, Jr. et al. | |
| 5,857,433 A | 1/1999 | Files | |
| 5,870,029 A | 2/1999 | Otto et al. | |
| 5,872,516 A | 2/1999 | Bonge, Jr. | |
| 5,886,669 A | 3/1999 | Kita | |
| 5,913,284 A | 6/1999 | Van Curen et al. | |
| 5,923,254 A | 7/1999 | Brune | |
| 5,927,233 A | 7/1999 | Mainini et al. | |
| 5,933,079 A | 8/1999 | Frink | |
| 5,934,225 A | 8/1999 | Williams | |
| 5,949,350 A | 9/1999 | Girard et al. | |
| 5,957,983 A | 9/1999 | Tominaga | |
| 5,982,291 A | 11/1999 | Williams et al. | |
| 6,016,100 A | 1/2000 | Boyd et al. | |
| 6,019,066 A | 2/2000 | Taylor | |
| 6,028,531 A | 2/2000 | Wanderlich | |
| 6,047,664 A | 4/2000 | Lyerly | |
| 6,067,018 A * | 5/2000 | Skelton | A01K 27/009 119/908 |
| 6,075,443 A | 6/2000 | Schepps et al. | |
| 6,166,643 A | 12/2000 | Janning et al. | |
| 6,170,439 B1 | 1/2001 | Duncan et al. | |
| 6,184,790 B1 | 2/2001 | Gerig | |
| 6,196,990 B1 | 3/2001 | Zicherman | |
| 6,204,762 B1 | 3/2001 | Dering et al. | |
| 6,215,314 B1 | 4/2001 | Frankewich, Jr. | |
| 6,230,031 B1 | 5/2001 | Barber | |
| 6,230,661 B1 | 5/2001 | Yarnall, Jr. et al. | |
| 6,232,880 B1 | 5/2001 | Anderson et al. | |
| 6,271,757 B1 | 8/2001 | Touchton et al. | |
| 6,297,766 B1 | 10/2001 | Koeller | |
| 6,327,999 B1 | 12/2001 | Gerig | |
| 6,353,390 B1 | 3/2002 | Beri et al. | |
| 6,360,697 B1 | 3/2002 | Williams | |
| 6,360,698 B1 | 3/2002 | Stapelfeld et al. | |
| 6,404,338 B1 | 6/2002 | Koslar | |
| 6,415,742 B1 | 7/2002 | Lee et al. | |
| 6,426,464 B1 | 7/2002 | Spellman et al. | |
| 6,427,079 B1 | 7/2002 | Schneider et al. | |
| 6,431,121 B1 | 8/2002 | Mainini et al. | |
| 6,431,122 B1 | 8/2002 | Westrick et al. | |
| 6,441,778 B1 | 8/2002 | Durst et al. | |
| 6,459,378 B2 | 10/2002 | Gerig | |
| 6,487,992 B1 | 12/2002 | Hollis | |
| 6,561,137 B2 | 5/2003 | Oakman | |
| 6,581,546 B1 | 6/2003 | Dalland et al. | |
| 6,588,376 B1 | 7/2003 | Groh | |
| 6,598,563 B2 | 7/2003 | Kim et al. | |
| 6,600,422 B2 | 7/2003 | Barry et al. | |
| 6,637,376 B2 | 10/2003 | Lee et al. | |
| 6,657,544 B2 | 12/2003 | Barry et al. | |
| 6,668,760 B2 | 12/2003 | Groh et al. | |
| 6,700,492 B2 | 3/2004 | Touchton et al. | |
| 6,747,555 B2 | 6/2004 | Fellenstein et al. | |
| 6,798,887 B1 | 9/2004 | Andre | |
| 6,799,537 B1 | 10/2004 | Liao | |
| 6,807,720 B2 | 10/2004 | Brune et al. | |
| 6,820,025 B2 | 11/2004 | Bachmann et al. | |
| 6,825,768 B2 | 11/2004 | Stapelfeld et al. | |
| 6,830,012 B1 | 12/2004 | Swan | |
| 6,833,790 B2 | 12/2004 | Mejia et al. | |
| 6,874,447 B1 | 4/2005 | Kobett | |
| 6,888,502 B2 | 5/2005 | Beigel et al. | |
| 6,901,883 B2 | 6/2005 | Gillis et al. | |
| 6,903,682 B1 | 6/2005 | Maddox | |
| 6,907,844 B1 | 6/2005 | Crist et al. | |
| 6,907,883 B2 | 6/2005 | Lin | |
| 6,921,089 B2 | 7/2005 | Groh et al. | |
| 6,923,146 B2 | 8/2005 | Korbitz et al. | |
| 6,928,958 B2 | 8/2005 | Crist et al. | |
| 6,937,647 B1 | 8/2005 | Boyd et al. | |
| 6,956,483 B2 | 10/2005 | Schmitt et al. | |
| 6,970,090 B1 | 11/2005 | Sciarra | |
| 7,061,385 B2 | 6/2006 | Fong et al. | |
| 7,079,024 B2 | 7/2006 | Alarcon et al. | |
| 7,114,466 B1 | 10/2006 | Mayer | |
| 7,142,167 B2 | 11/2006 | Rochelle et al. | |
| 7,164,354 B2 | 1/2007 | Panzer | |
| 7,173,535 B2 | 2/2007 | Bach et al. | |
| 7,198,009 B2 | 4/2007 | Crist et al. | |
| 7,222,589 B2 | 5/2007 | Lee et al. | |
| 7,249,572 B2 | 7/2007 | Goetzl et al. | |
| 7,252,051 B2 | 8/2007 | Napolez et al. | |
| 7,259,718 B2 | 8/2007 | Patterson et al. | |
| 7,267,081 B2 | 9/2007 | Steinbacher | |

(56) References Cited

U.S. PATENT DOCUMENTS

| | | |
|---|---|---|
| 7,275,502 B2 | 10/2007 | Boyd et al. |
| 7,296,540 B2 | 11/2007 | Boyd |
| 7,319,397 B2 | 1/2008 | Chung et al. |
| 7,328,671 B2 | 2/2008 | Kates |
| 7,339,474 B2 | 3/2008 | Easley et al. |
| 7,382,328 B2 | 6/2008 | Lee et al. |
| 7,394,390 B2 | 7/2008 | Gerig |
| 7,395,966 B2 | 7/2008 | Braiman |
| 7,403,744 B2 | 7/2008 | Bridgelall |
| 7,404,379 B2 | 7/2008 | Nottingham et al. |
| 7,411,492 B2 | 8/2008 | Greenberg et al. |
| 7,426,906 B2 | 9/2008 | Nottingham et al. |
| 7,434,541 B2 | 10/2008 | Kates |
| 7,443,298 B2 | 10/2008 | Cole et al. |
| 7,477,155 B2 | 1/2009 | Bach et al. |
| 7,503,285 B2 | 3/2009 | Mainini et al. |
| 7,518,275 B2 | 4/2009 | Suzuki et al. |
| 7,518,522 B2 | 4/2009 | So et al. |
| 7,538,679 B2 | 5/2009 | Shanks |
| 7,546,817 B2 | 6/2009 | Moore |
| 7,552,699 B2 | 6/2009 | Moore |
| 7,559,291 B2 | 7/2009 | Reinhart |
| 7,562,640 B2 | 7/2009 | Lalor |
| 7,565,885 B2 | 7/2009 | Moore |
| 7,574,979 B2 | 8/2009 | Nottingham et al. |
| 7,583,931 B2 | 9/2009 | Eu et al. |
| 7,602,302 B2 | 10/2009 | Hokuf et al. |
| 7,612,668 B2 | 11/2009 | Harvey |
| 7,616,124 B2 | 11/2009 | Paessel et al. |
| 7,656,291 B2 | 2/2010 | Rochelle et al. |
| 7,658,166 B1 | 2/2010 | Rheinschmidt, Jr. et al. |
| 7,667,599 B2 | 2/2010 | Mainini et al. |
| 7,667,607 B2 | 2/2010 | Gerig et al. |
| 7,680,645 B2 | 3/2010 | Li et al. |
| 7,705,736 B1 | 4/2010 | Kedziora |
| 7,710,263 B2 | 5/2010 | Boyd |
| 7,760,137 B2 | 7/2010 | Martucci et al. |
| 7,779,788 B2 | 8/2010 | Moore |
| 7,786,876 B2 | 8/2010 | Troxler et al. |
| 7,804,724 B2 | 9/2010 | Way |
| 7,814,865 B2 | 10/2010 | Tracy et al. |
| 7,828,221 B2 | 11/2010 | Kwon |
| 7,830,257 B2 | 11/2010 | Hassell |
| 7,834,769 B2 | 11/2010 | Hinkle et al. |
| 7,841,301 B2 | 11/2010 | Mainini et al. |
| 7,856,947 B2 | 12/2010 | Giunta |
| 7,864,057 B2 | 1/2011 | Milnes et al. |
| 7,868,912 B2 | 1/2011 | Venetianer et al. |
| 7,900,585 B2 | 3/2011 | Lee et al. |
| 7,918,190 B2 | 4/2011 | Belcher et al. |
| 7,944,359 B2 | 5/2011 | Fong et al. |
| 7,946,252 B2 | 5/2011 | Lee, IV et al. |
| 7,978,078 B2 | 7/2011 | Copeland et al. |
| 7,996,983 B2 | 8/2011 | Lee et al. |
| 8,011,327 B2 | 9/2011 | Mainini et al. |
| 8,047,161 B2 | 11/2011 | Moore et al. |
| 8,049,630 B2 | 11/2011 | Chao et al. |
| 8,065,978 B2 | 11/2011 | Duncan et al. |
| 8,069,823 B2 | 12/2011 | Mainini et al. |
| 8,098,164 B2 | 1/2012 | Gerig et al. |
| 8,159,355 B2 | 4/2012 | Gerig et al. |
| 8,161,915 B2 | 4/2012 | Kim |
| 8,185,345 B2 | 5/2012 | Mainini |
| 8,232,909 B2 | 7/2012 | Kroeger et al. |
| 8,240,085 B2 | 8/2012 | Hill |
| 8,269,504 B2 | 9/2012 | Gerig |
| 8,274,396 B2 | 9/2012 | Gurley et al. |
| 8,297,233 B2 | 10/2012 | Rich et al. |
| 8,342,134 B2 | 1/2013 | Lee et al. |
| 8,342,135 B2 | 1/2013 | Peinetti et al. |
| 8,430,064 B2 | 4/2013 | Groh et al. |
| 8,436,735 B2 | 5/2013 | Mainini et al. |
| 8,447,510 B2 | 5/2013 | Fitzpatrick et al. |
| 8,451,130 B2 | 5/2013 | Mainini |
| 8,456,296 B2 | 6/2013 | Piltonen et al. |
| 8,483,262 B2 | 7/2013 | Mainini et al. |
| 8,714,113 B2 | 5/2014 | Lee, IV et al. |
| 8,715,824 B2 | 5/2014 | Rawlings et al. |
| 8,736,499 B2 | 5/2014 | Goetzl et al. |
| 8,779,925 B2 | 7/2014 | Rich et al. |
| 8,803,692 B2 | 8/2014 | Goetzl et al. |
| 8,807,089 B2 | 8/2014 | Brown et al. |
| 8,823,513 B2 | 9/2014 | Jameson et al. |
| 8,854,215 B1 | 10/2014 | Ellis et al. |
| 8,866,605 B2 | 10/2014 | Gibson |
| 8,908,034 B2 | 12/2014 | Bordonaro |
| 8,917,172 B2 | 12/2014 | Charych |
| 8,947,240 B2 | 2/2015 | Mainini |
| 8,967,085 B2 | 3/2015 | Gillis et al. |
| 9,035,773 B2 | 5/2015 | Petersen et al. |
| 9,125,380 B2 | 9/2015 | Deutsch |
| 9,131,660 B2 | 9/2015 | Womble |
| 9,186,091 B2 | 11/2015 | Mainini et al. |
| 9,204,251 B1 | 12/2015 | Mendelson et al. |
| 9,307,745 B2 | 4/2016 | Mainini |
| 9,516,863 B2 | 12/2016 | Gerig et al. |
| 9,861,076 B2 | 1/2018 | Rochelle et al. |
| 10,045,512 B2 | 8/2018 | Mainini et al. |
| 10,070,621 B1 | 9/2018 | Hacham David |
| 10,514,439 B2 | 12/2019 | Seltzer |
| 10,757,672 B1 | 8/2020 | Knas et al. |
| 10,879,600 B2 | 12/2020 | Kim et al. |
| 2002/0010390 A1 | 1/2002 | Guice et al. |
| 2002/0015094 A1 | 2/2002 | Kuwano et al. |
| 2002/0036569 A1 | 3/2002 | Martin |
| 2002/0092481 A1 | 7/2002 | Spooner |
| 2002/0196151 A1 | 12/2002 | Troxler |
| 2003/0034887 A1 | 2/2003 | Crabtree et al. |
| 2003/0035051 A1 | 2/2003 | Cho et al. |
| 2003/0116099 A1 | 6/2003 | Kim et al. |
| 2003/0154928 A1 | 8/2003 | Lee et al. |
| 2003/0218539 A1 | 11/2003 | Hight |
| 2004/0108939 A1 | 6/2004 | Giunta |
| 2004/0162875 A1 | 8/2004 | Brown |
| 2004/0263322 A1 | 12/2004 | Onaru et al. |
| 2005/0000469 A1 | 1/2005 | Giunta et al. |
| 2005/0007251 A1 | 1/2005 | Crabtree et al. |
| 2005/0020279 A1 | 1/2005 | Markhovsky et al. |
| 2005/0035865 A1 | 2/2005 | Brennan et al. |
| 2005/0059909 A1 | 3/2005 | Burgess |
| 2005/0081797 A1 | 4/2005 | Laitinen et al. |
| 2005/0139169 A1 | 6/2005 | So et al. |
| 2005/0145196 A1 | 7/2005 | Crist et al. |
| 2005/0145199 A1 | 7/2005 | Napolez et al. |
| 2005/0148346 A1 | 7/2005 | Maloney et al. |
| 2005/0172912 A1 | 8/2005 | Crist et al. |
| 2005/0217606 A1 | 10/2005 | Lee et al. |
| 2005/0231353 A1 | 10/2005 | DiPoala et al. |
| 2005/0254663 A1 | 11/2005 | Raptopoulos et al. |
| 2005/0258715 A1 | 11/2005 | Schlabach et al. |
| 2005/0280544 A1 | 12/2005 | Mishelevich |
| 2005/0280546 A1 | 12/2005 | Ganley et al. |
| 2005/0288007 A1 | 12/2005 | Benco et al. |
| 2006/0000015 A1 | 1/2006 | Duncan |
| 2006/0011145 A1 | 1/2006 | Kates et al. |
| 2006/0037559 A1 | 2/2006 | Belcher |
| 2006/0061469 A1 | 3/2006 | Jaeger et al. |
| 2006/0092676 A1 | 5/2006 | Liptak et al. |
| 2006/0102100 A1 | 5/2006 | Becker et al. |
| 2006/0102101 A1 | 5/2006 | Kim |
| 2006/0112901 A1 | 6/2006 | Gomez |
| 2006/0196445 A1 | 9/2006 | Kates |
| 2006/0197672 A1 | 9/2006 | Talamas, Jr. et al. |
| 2007/0011339 A1 | 1/2007 | Brown |
| 2007/0107668 A1 | 5/2007 | Eaton et al. |
| 2007/0197878 A1 | 8/2007 | Shklarski |
| 2007/0204803 A1 | 9/2007 | Ramsay |
| 2007/0204804 A1 | 9/2007 | Swanson et al. |
| 2007/0209604 A1 | 9/2007 | Groh et al. |
| 2007/0249470 A1 | 10/2007 | Niva et al. |
| 2007/0266959 A1 | 11/2007 | Brooks et al. |
| 2008/0004539 A1 | 1/2008 | Ross |
| 2008/0055155 A1 | 3/2008 | Hensley et al. |
| 2008/0058670 A1 | 3/2008 | Mainini et al. |

(56) References Cited

U.S. PATENT DOCUMENTS

| | | |
|---|---|---|
| 2008/0061978 A1 | 3/2008 | Huang |
| 2008/0119757 A1 | 5/2008 | Winter |
| 2008/0129457 A1 | 6/2008 | Ritter et al. |
| 2008/0141949 A1 | 6/2008 | Taylor |
| 2008/0143516 A1 | 6/2008 | Mock et al. |
| 2008/0156277 A1 | 7/2008 | Mainini et al. |
| 2008/0163827 A1 | 7/2008 | Goetzl |
| 2008/0186167 A1 | 8/2008 | Ramachandra |
| 2008/0204322 A1 | 8/2008 | Oswald et al. |
| 2008/0216766 A1 | 9/2008 | Martin et al. |
| 2008/0236514 A1 | 10/2008 | Johnson et al. |
| 2008/0252527 A1 | 10/2008 | Garcia |
| 2009/0000566 A1 | 1/2009 | Kim |
| 2009/0002188 A1 | 1/2009 | Greenberg |
| 2009/0012355 A1 | 1/2009 | Lin |
| 2009/0020002 A1 | 1/2009 | Williams et al. |
| 2009/0025651 A1 | 1/2009 | Lalor |
| 2009/0031966 A1 | 2/2009 | Kates |
| 2009/0061772 A1 | 3/2009 | Moon et al. |
| 2009/0082830 A1 | 3/2009 | Folkerts et al. |
| 2009/0102668 A1 | 4/2009 | Thompson et al. |
| 2009/0112284 A1 | 4/2009 | Smith et al. |
| 2009/0129338 A1 | 5/2009 | Horn et al. |
| 2009/0224909 A1 | 9/2009 | Derrick et al. |
| 2009/0239586 A1 | 9/2009 | Boeve et al. |
| 2009/0289785 A1 | 11/2009 | Leonard |
| 2009/0289844 A1 | 11/2009 | Palsgrove et al. |
| 2009/0299742 A1 | 12/2009 | Toman et al. |
| 2010/0008011 A1 | 1/2010 | Ogram |
| 2010/0019903 A1 | 1/2010 | Sawaya |
| 2010/0047119 A1 | 2/2010 | Cressy |
| 2010/0049364 A1 | 2/2010 | Landry et al. |
| 2010/0107985 A1 | 5/2010 | O'Hare |
| 2010/0139576 A1 | 6/2010 | Kim et al. |
| 2010/0201525 A1 | 8/2010 | Bahat et al. |
| 2010/0231391 A1 | 9/2010 | Dror et al. |
| 2010/0238022 A1 | 9/2010 | Au et al. |
| 2010/0315241 A1 | 12/2010 | Jow |
| 2010/0321180 A1 | 12/2010 | Dempsey et al. |
| 2011/0140967 A1 | 6/2011 | Lopez et al. |
| 2011/0182438 A1 | 7/2011 | Koike et al. |
| 2011/0203529 A1 | 8/2011 | Mainini et al. |
| 2012/0000431 A1 | 1/2012 | Khoshkish et al. |
| 2012/0006282 A1 | 1/2012 | Kates |
| 2012/0032855 A1 | 2/2012 | Reede |
| 2012/0037088 A1 | 2/2012 | Altenhofen |
| 2012/0078139 A1 | 3/2012 | Aldridge et al. |
| 2012/0087204 A1 | 4/2012 | Urbano et al. |
| 2012/0132151 A1 | 5/2012 | Touchton et al. |
| 2012/0165012 A1 | 6/2012 | Fischer et al. |
| 2012/0236688 A1 | 9/2012 | Spencer et al. |
| 2012/0312250 A1 | 12/2012 | Jesurum |
| 2013/0099920 A1 | 4/2013 | Song et al. |
| 2013/0099922 A1 | 4/2013 | Lohbihler |
| 2013/0113621 A1* | 5/2013 | So ................. A01K 11/008 340/539.13 |
| 2013/0157564 A1 | 6/2013 | Curtis et al. |
| 2013/0169441 A1 | 7/2013 | Wilson |
| 2013/0181861 A1 | 7/2013 | Zohar et al. |
| 2013/0203027 A1 | 8/2013 | De Villers-Sidani et al. |
| 2013/0227540 A1 | 8/2013 | Ruster et al. |
| 2013/0321159 A1 | 12/2013 | Schofield et al. |
| 2013/0340305 A1 | 12/2013 | Mobley |
| 2014/0020635 A1 | 1/2014 | Sayers et al. |
| 2014/0053788 A1 | 2/2014 | Riddell |
| 2014/0057232 A1 | 2/2014 | Wetmore et al. |
| 2014/0062695 A1 | 3/2014 | Rosen et al. |
| 2014/0069350 A1 | 3/2014 | Riddell |
| 2014/0073939 A1 | 3/2014 | Rodriguez-Llorente et al. |
| 2014/0120943 A1 | 5/2014 | Shima |
| 2014/0123912 A1 | 5/2014 | Menkes et al. |
| 2014/0132608 A1 | 5/2014 | Mund et al. |
| 2014/0174376 A1 | 6/2014 | Touchton et al. |
| 2014/0176305 A1 | 6/2014 | Aljadeff |
| 2014/0228649 A1 | 8/2014 | Rayner et al. |
| 2014/0228927 A1 | 8/2014 | Ahmad et al. |
| 2014/0253368 A1 | 9/2014 | Holder |
| 2014/0253389 A1 | 9/2014 | Beauregard |
| 2014/0261235 A1 | 9/2014 | Rich et al. |
| 2014/0265568 A1 | 9/2014 | Crafts et al. |
| 2014/0267299 A1 | 9/2014 | Couse |
| 2014/0275824 A1 | 9/2014 | Couse et al. |
| 2014/0276278 A1 | 9/2014 | Smith et al. |
| 2014/0307888 A1 | 10/2014 | Alderson et al. |
| 2014/0343599 A1 | 11/2014 | Smith et al. |
| 2014/0358592 A1 | 12/2014 | Wedig et al. |
| 2015/0040840 A1 | 2/2015 | Muetzel et al. |
| 2015/0043744 A1 | 2/2015 | Lagodzinski et al. |
| 2015/0053144 A1 | 2/2015 | Bianchi et al. |
| 2015/0075446 A1 | 3/2015 | Hu |
| 2015/0080013 A1 | 3/2015 | Venkatraman et al. |
| 2015/0107531 A1 | 4/2015 | Golden |
| 2015/0149111 A1 | 5/2015 | Kelly et al. |
| 2015/0163412 A1 | 6/2015 | Holley et al. |
| 2015/0172872 A1 | 6/2015 | Alsehly et al. |
| 2015/0199490 A1 | 7/2015 | Iancu et al. |
| 2015/0223013 A1 | 8/2015 | Park et al. |
| 2015/0289111 A1 | 10/2015 | Ozkan et al. |
| 2015/0350848 A1 | 12/2015 | Eramian |
| 2015/0358768 A1 | 12/2015 | Luna et al. |
| 2016/0015005 A1 | 1/2016 | Brown, Jr. et al. |
| 2016/0021506 A1 | 1/2016 | Bonge, Jr. |
| 2016/0021850 A1 | 1/2016 | Stapelfeld et al. |
| 2016/0029466 A1 | 1/2016 | DeMao et al. |
| 2016/0044444 A1 | 2/2016 | Rattner et al. |
| 2016/0084801 A1 | 3/2016 | Robinson et al. |
| 2016/0094419 A1 | 3/2016 | Peacock et al. |
| 2016/0102879 A1 | 4/2016 | Guest et al. |
| 2016/0125867 A1 | 5/2016 | Jarvinen et al. |
| 2016/0150362 A1 | 5/2016 | Shaprio et al. |
| 2016/0174099 A1 | 6/2016 | Goldfain |
| 2016/0178392 A1 | 6/2016 | Goldfain |
| 2016/0187454 A1 | 6/2016 | Orman et al. |
| 2016/0234649 A1 | 8/2016 | Finnerty et al. |
| 2016/0253987 A1 | 9/2016 | Chattell |
| 2016/0292635 A1 | 10/2016 | Todasco |
| 2016/0335917 A1 | 11/2016 | Lydecker et al. |
| 2016/0363664 A1 | 12/2016 | Mindell et al. |
| 2016/0366813 A1 | 12/2016 | Haneda et al. |
| 2017/0026798 A1 | 1/2017 | Prevatt |
| 2017/0042121 A1 | 2/2017 | Jersa, III et al. |
| 2017/0212205 A1 | 7/2017 | Bialer et al. |
| 2017/0323630 A1 | 11/2017 | Stickney et al. |
| 2018/0027772 A1 | 2/2018 | Gordon et al. |
| 2018/0077509 A1 | 3/2018 | Jones et al. |
| 2018/0078735 A1 | 3/2018 | Dalgleish et al. |
| 2018/0094451 A1 | 4/2018 | Peter et al. |
| 2018/0188351 A1 | 7/2018 | Jones et al. |
| 2018/0190311 A1 | 7/2018 | Kato et al. |
| 2018/0210704 A1 | 7/2018 | Jones et al. |
| 2018/0234134 A1 | 8/2018 | Tang et al. |
| 2018/0235182 A1 | 8/2018 | Bocknek |
| 2018/0249680 A1 | 9/2018 | Van Curen et al. |
| 2018/0303066 A1 | 10/2018 | Weimin et al. |
| 2018/0315262 A1 | 11/2018 | Love et al. |
| 2019/0013003 A1 | 1/2019 | Baughman et al. |
| 2019/0066651 A1 | 2/2019 | Yang |
| 2019/0110430 A1 | 4/2019 | Badiou |
| 2019/0165832 A1 | 5/2019 | Khanduri et al. |
| 2020/0367810 A1 | 11/2020 | Shouldice et al. |

FOREIGN PATENT DOCUMENTS

| | | |
|---|---|---|
| CN | 102793568 B | 12/2014 |
| JP | H0974774 A | 3/1997 |
| KR | 20130128704 A | 11/2013 |
| KR | 20180059684 A | 6/2018 |
| KR | 101911312 B1 | 1/2019 |
| WO | WO-02060240 A3 | 2/2003 |
| WO | WO-2006000015 A1 | 1/2006 |
| WO | WO-2008085812 A2 | 7/2008 |
| WO | WO-2008140992 A1 | 11/2008 |
| WO | WO-2009105243 A2 | 8/2009 |
| WO | WO-2009106896 A2 | 9/2009 |

(56) References Cited

FOREIGN PATENT DOCUMENTS

| WO | WO-2011055004 A1 | 5/2011 |
|---|---|---|
| WO | WO-2011136816 A1 | 11/2011 |
| WO | WO-2011160698 A1 | 12/2011 |
| WO | WO-2012122607 A1 | 9/2012 |
| WO | WO-2015015047 A1 | 2/2015 |
| WO | WO-2016204799 A1 | 12/2016 |

OTHER PUBLICATIONS

CRUTCHFIELD., "What You Need to Know About Sound Masking," 2021, pp. 1-7.
Integrated Building System., "The What, Where, Why and How of Sound Masking," 2016, 6 pages.
Nam M., et al., "Combined Scheduling of Sensing and Communication for Real-Time Indoor Tracking in Assisted Living," IEEE Real Time System Symposium, 2007, 10 pages.
Radoi I.E., et al., "Tracking and Monitoring Horses in the Wild Using Wireless Sensor Networks," IEEE International Conference on Wireless and Mobile Computing, Networking and Communications, 2015, 8 pages.
Supplementary European Search Report for European Application No. 18887374.9, dated Aug. 10, 2021, 7 pages.
Supplementary European Search Report for European Application No. 18888089.2, dated Aug. 6, 2021, 6 pages.
Supplementary European Search Report for European Application No. 18889799.5, dated Aug. 13, 2021, 10 pages.
Wood D.J., "Speech Privacy & Sound Masking in Modern Architecture," 2008, 51 pages.
Baba A. I., et al., "Calibrating Time of Flight in Two Way Ranging," IEEE Xplore Digital Library, Dec. 2011, pp. 393-397.
Eileen A., "How to Protect Your Dog From Loud and Scary Sounds," 2013, pp. 1-8.
Extended European Search Report for Application No. EP17180645, mailed on May 9, 2018, 7 pages.
Extended European Search Report for European Application No. 18738816, dated Sep. 29, 2020, 10 pages.
Extended European Search Report for European Application No. 11784149.4, dated Nov. 17, 2017, 7 pages.
Extended European Search Report for European Application No. 15735439.0, dated Oct. 18, 2017, 9 pages.
Extended European Search Report for European Application No. 15895839.7, dated Oct. 9, 2018, 5 pages.
Extended European Search Report for European Application No. 17162289.7, dated Aug. 31, 2017, 7 pages.
Extended European Search Report for European Application No. 18738547.1, dated Sep. 24, 2020, 9 pages.
Extended European Search Report for European Application No. 18738743.6, dated Sep. 24, 2020, 11 pages.
High Tech Products, Inc., "Human Contain Model X-10 Rechargeable Multi-function Electronic Dog Fence Ultra-system," Internet citation, Retrieved from the Internet: URL: http://web.archive.org/web/20120112221915/http://hightechpet.com/user_Manuals/HC%20X-10_Press.pdf [retrieved on Apr. 10, 2017], Apr. 28, 2012, pp. 1-32, XP008184171.
Info Unlimited "Canine 10RC-HP10 Instructions"; Instruction manual V.0420; Publication 12 & 15 [online]. Jun. 14, 2013 [retrieved Sep. 29, 2020]. Retrieved from the Internet: URL: https://www.amazing1.com/content/download/CANINE10_Instructions.pdf.
Info Unlimited "Canine 10RC-HP10 Instructions" Instruction manual V.0420. [Retrieved on Jul. 8, 2017]. Retrieved from the Internet: URL: https://www.amazing1.com/content/download/CANINE10_Instructions.pdf.
International Search Report and Written Opinion for Application No. PCT/US2020/042601, dated Nov. 9, 2020, 11 pages.
International Preliminary Report for Patentability Chapter II for International Application No. PCT/US2014/024875, dated Mar. 12, 2015, 17 pages.
International Preliminary Report on Patentability for Application No. PCT/US2015/043653, dated Dec. 19, 2017, 14 pages.
International Search Report and Written Opinion for Application No. PCT/US2018/013737, dated Mar. 7, 2018, 8 pages.
International Search Report and Written Opinion for Application No. PCT/US2018/013738, dated Mar. 20, 2018, 6 pages.
International Search Report and Written Opinion for Application No. PCT/US2018/013740, dated Mar. 20, 2018, 6 pages.
International Search Report and Written Opinion for Application No. PCT/US2018/019887, dated May 8, 2018, 10 pages.
International Search Report and Written Opinion for Application No. PCT/US2018/065122. mailed on Mar. 25, 2019, 7 pages.
International Search Report and Written Opinion for Application No. PCT/US2018/065154. dated Apr. 23, 2019, 7 pages.
International Search Report and Written Opinion for Application No. PCT/US2018/065938, mailed on Mar. 8, 2019, 9 pages.
International Search Report and Written Opinion for Application No. PCT/US2020/016617, mailed on Apr. 27, 2020, 13 pages.
International Search Report and Written Opinion for International Application No. PCT/US2014/024875, dated Jun. 27, 2014, 12 pages.
International Search Report for International Application No. PCT/US2014/020344, dated Jun. 5, 2014, 2 pages.
International Search Report for International Application No. PCT/US2014/066650, dated Feb. 19, 2015, 3 pages (Outgoing).
International Search Report for International Application No. PCT/US2015/010864, Form PCT/ISA/210 dated Apr. 13, 2015, 2 pages.
International Search Report for International Application No. PCT/US2015/043653, Form PCT/ISA/210 dated Oct. 23, 2015, 2 pages.
Jondhale S. R., et al., "Issues and Challenges in RSSI Based Target Localization and Tracking in Wireless Sensor Networks," International Conference on Automatic Control and Dynamic Optimization Techniques (ICACDOT),2016, pp. 594-598.
Joshi A., et al., "GPS-less Animal Tracking System," Fourth International Conference on Wireless Communication and Sensor Networks,2008, pp. 120-125.
Kuo S., et al., "Detecting Movement of Beacons in Location-Tracking Wireless Sensor Networks," IEEE 66th Vehicular Technology Conference, 2007, pp. 362-366.
Kuo S., et al., "The Beacon Movement Detection Problem in Wireless Sensor Networks for Localization Applications," IEEE Transactions on Mobile Computing, Oct. 2009, vol. 8(10), pp. 1326-1338.
Millner H., et al., "Wireless 3D Localization of Animals for Trait and Behavior Analysis in Indoor & Outdoor Areas," IEEE MTT-S International Microwave Workshop on Wireless Sensing, Local Positioning, and RFID, 2009, pp. 1-4.
Notification of Transmittal of the International Search Report and the Written Opinion of the International Searching Authority for International Application No. PCT/US2015/043653, Form PCT/ISA/220 dated Oct. 23, 2015, 1 page.
Notification of Transmittal of the International Search Report and Written Opinion for the International Application No. PCT/US2014/066650, dated Feb. 19, 2015, 1 page.
Panicker, G. J., et al., "A LoRa Wireless Mesh Network for Wide-Area Animal Tracking," IEEE International Conference on Electrical, Computer and Communication Technologies,2019, pp. 1-5.
Welch G., et al., "An Introduction to the Kalman Filter," Department of Computer Science, Jul. 24, 2006, pp. 1-16.
Written Opinion for International Application No. PCT/US2014/066650, dated Feb. 19, 2015, 15 pages(outgoing).
Written Opinion for International Application No. PCT/US2015/043653, Form PCT/ISA/237 dated Oct. 23, 2015, 13 pages.
Written Opinion of the International Application No. PCT/US2015/010864, Form PCT/ISA/237 dated Apr. 13, 2015, 6 pages.
Cavalcante A.M., et al., "Audio Beacon Providing Location-Aware Content for Low-End Mobile Devices," International Conference on Indoor Positioning and Indoor Navigation, 2012, 1-9 pages.
Dieng O., et al., "Outdoor Localization and Distance Estimation Based on Dynamic RSSI Measurements in LoRa Networks," International Conference on Wireless and Mobile Computing, Networking and Communications, 2019, 6 pages.

(56) References Cited

OTHER PUBLICATIONS

Jukan A., et al., "Smart Computing and Sensing Technologies for Animal Welfare: A Systematic Review," ACM Computing Surveys, 2016, vol. 50(1), pp. 1-27.
Wang Q., et al., The Recent Progress in Animal Models of Depression, Progress in Neuro-psychopharmacology & Biological Psychiatry , 2017, vol. 77, pp. 99-109.

* cited by examiner

INTEGRATED APPARATUS AND METHOD TO COMBINE A WIRELESS FENCE COLLAR WITH GPS TRACKING CAPABILITY

BACKGROUND OF THE INVENTION

This application is a continuation application of U.S. application Ser. No. 16/253,708, filed Jan. 22, 2019, which is a continuation application of U.S. application Ser. No. 14/200,362, filed Mar. 7, 2014, which claims the benefit U.S. Application No. 61/788,559, filed Mar. 15, 2013.

FIELD OF THE INVENTION

The present invention is related to the field of animal control and containment and, more particularly, to a dog collar that is configured to both operate with a wireless fence system to contain a dog and provide GPS tracking capability when the dog has escaped from the area defined by the wireless fence system.

Description of the Related Art

GPS tracking systems are used in connection with a variety of equipment including telephones, motor vehicles, wireless radio systems, etc. Dog collars that emit an RF signal are also available and are used with a handheld device that tracks the location of the dog that is wearing the collar using GPS coordinates. However, these wireless fence systems and GPS tracking devices operate as separate systems and are not integrated as they serve different purposes.

Hence, there is a need for an integrated apparatus and method which incorporates GPS tracking capability within a collar that is configured to operate as part of a wireless fence system for the containment and tracking of an animal wearing the collar, such as a dog and the like.

SUMMARY OF THE INVENTION

In view of the foregoing, the present invention is directed to a collar configured to operate within a wireless fence system to contain a dog and further configured to provide GPS tracking capability when the dog has escaped from the area defined by the wireless fence system. As long as the dog remains in the area defined by the wireless fence, the collar operates solely in cooperation with the wireless transmitters used as part of the wireless fence system. The GPS tracking function remains "asleep" and is not activated unless and until the dog escapes. Once activated, operation of the GPS enables the dog owner or other individual to locate the dog with a GPS receiver that is configured for communication with the collar.

Accordingly, it is an object of the present invention to provide an integrated apparatus and method of operation for a dog collar that provides the user with both a containment function and a GPS locating function.

Another object of the present invention is to provide an integrated apparatus and method of operation for a dog collar in accordance with the preceding object that includes two separate printed circuit boards (PCBs), one for operation with a wireless fence system and the other for GPS operation.

A further object of the present invention is to provide an integrated apparatus and method of operation for a dog collar in accordance with the preceding objects in which each PCB is powered by its own battery so that the collar includes one battery utilized exclusively for fence operation and a second battery that is held in reserve for the GPS operation.

A still further object of the present invention is to provide an integrated apparatus and method of operation for a dog collar in accordance with the preceding objects in which the collar's wireless fence containment function is shut down when GPS operation is powered up.

Yet another object of the present invention is to provide an integrated apparatus and method of operation for a dog collar in accordance with the preceding objects that uses cell phone technology in conjunction with the GPS to track the dog's location and send SMS messages and/or email with information on the dog's location to a user's smart-phone, tablet, PC or other suitable device.

Still another object of the present invention is to provide an integrated apparatus and method of operation for a dog collar in accordance with the preceding objects that uses a mapping service to display the dog's location.

It is yet another object of the invention to provide an integrated apparatus and method of operation for a dog collar that is not complex in structure and which can be manufactured at low cost but yet efficiently combines both fence containment and GPS tracking capabilities.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
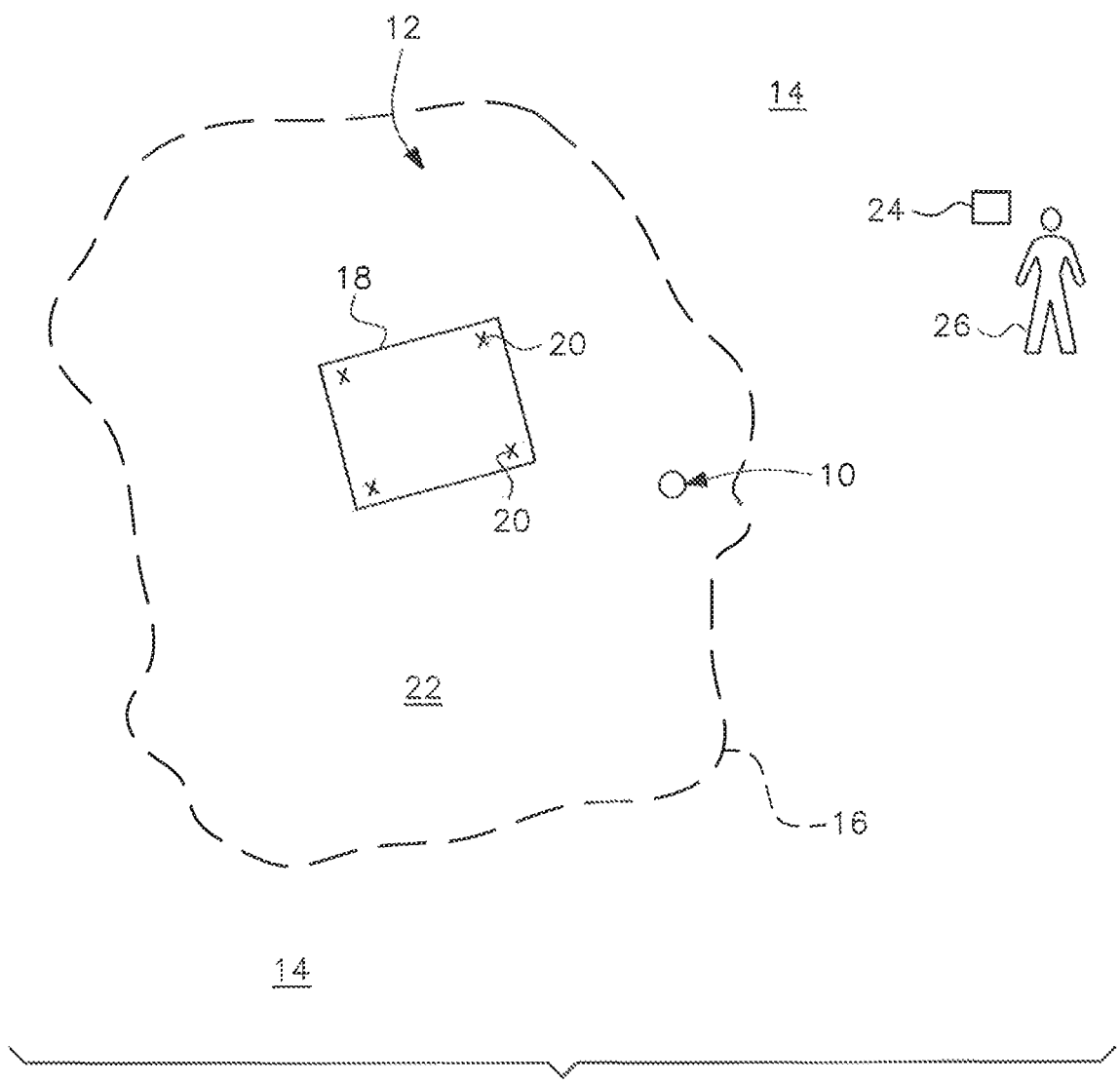
FIG. 1 shows a house with multiple transmitter units that are used to track the location of a dog within a wireless fence system and the surrounding GPS zone.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIG. 1, the present invention is directed to a collar generally designated by reference numeral 10 that is operative within a wireless fence system, generally designated by reference numeral 12. The wireless fence system 12 is surrounded by the GPS zone. The GPS zone represents virtually the entire geographic area outside the containment area 22 defined by the fence 16 of the wireless fence system 12.

The wireless fence system includes at least one transmitter 20, and preferably a plurality of transmitters 20, positioned within a house 18 or other building which serves as a base. The transmitters 20 track the location of the collar (and the dog wearing the collar) within the containment area 22. In the embodiment shown, four transmitters are used. A full description of a wireless fence system compatible with the present invention is set forth in U.S. Publ. No. 2011/0298615 ("the '615 publication"), the subject matter of which is hereby incorporated by reference as if set forth herein in its entirety.

The '615 publication, as incorporated by reference herein, also provides a description of a collar that could be modified to include the GPS capability of the instant invention.

Figure 2:
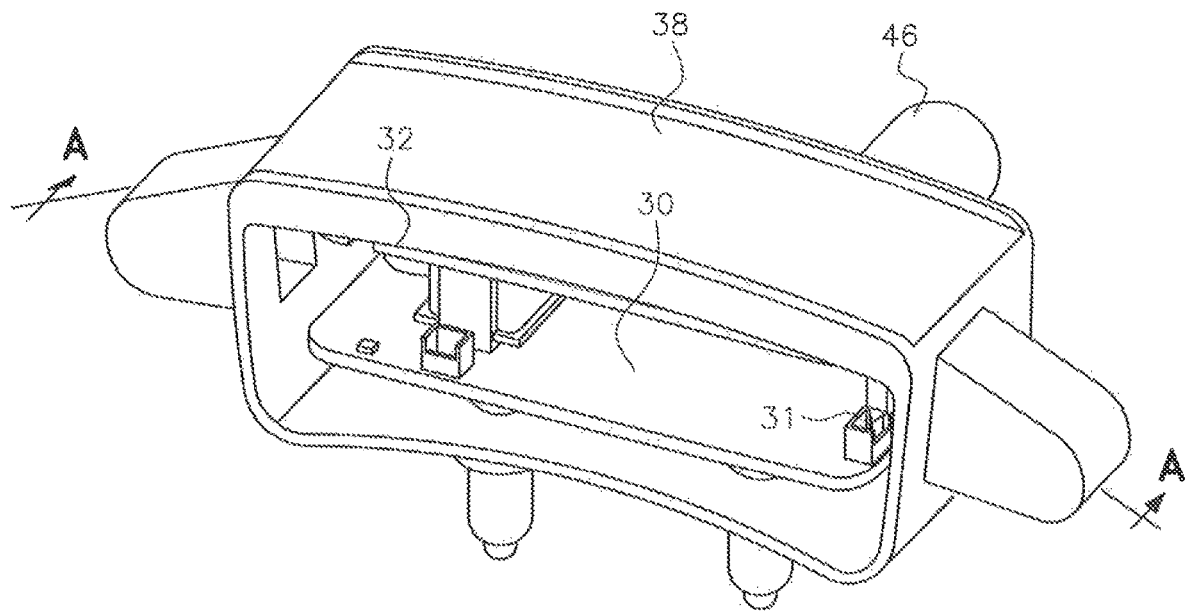
FIG. 2 is a cutaway perspective view of the control unit with two PCBs in accordance with the present invention.
Figure 3:
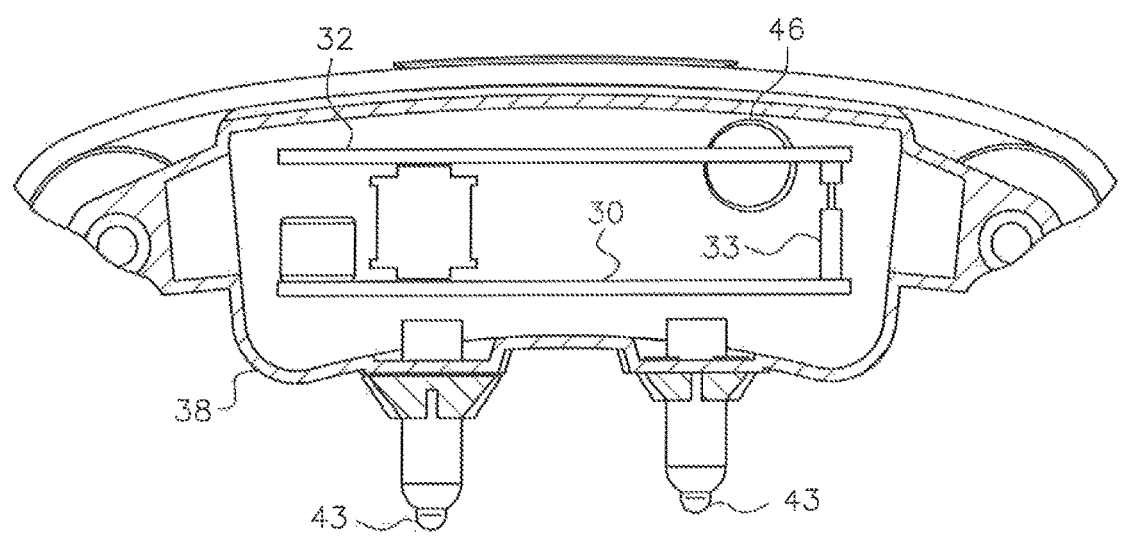
FIG. 3 is a sectional view taken along line A-A of FIG. 2.
Figure 10:
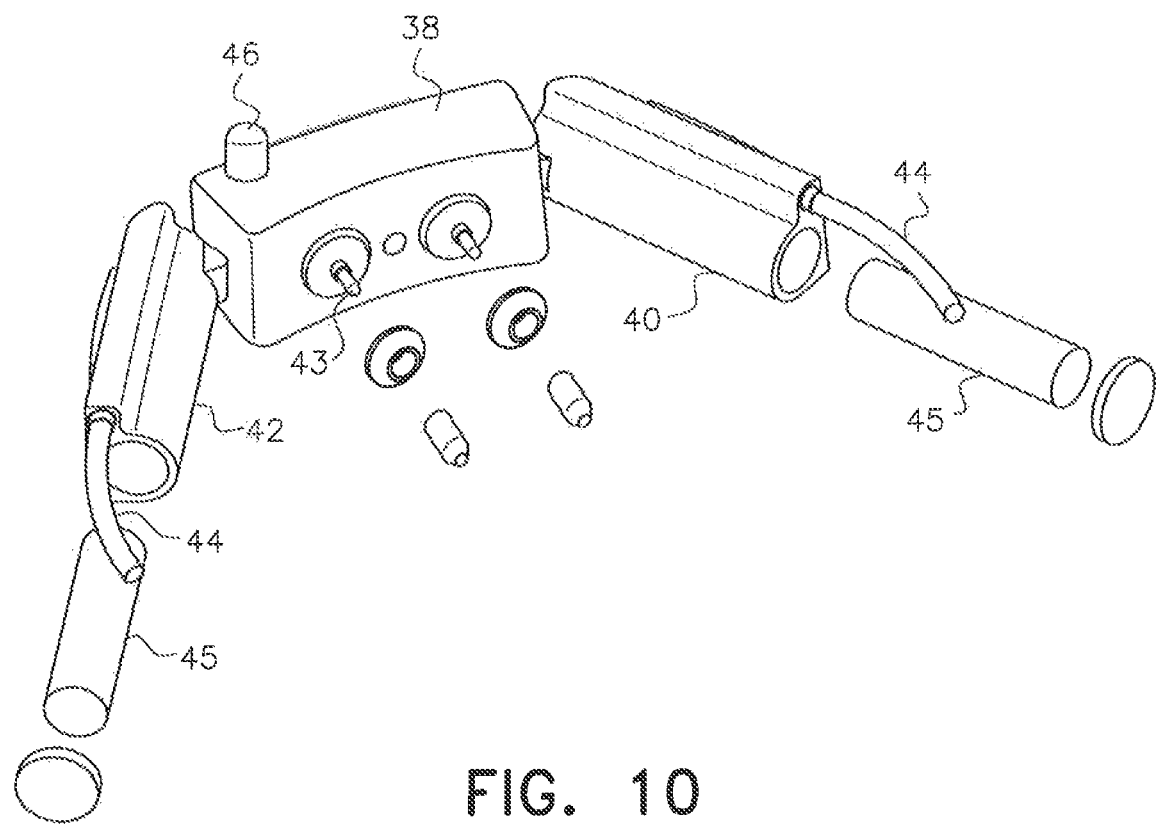
FIG. 10 is an exploded perspective view of the collar components from the angle shown in FIG. 9A.

In addition to the features set forth in the collar described in the '615 publication, the collar according to the present invention includes two separate printed circuit boards (PCBs) as shown in FIGS. 2 and 3. Each PCB is powered by its own battery 45 so that the collar includes one battery utilized exclusively for fence operation, i.e., "fence mode", and a second battery that is held in reserve for the GPS operation, i.e., "GPS mode" (see FIG. 10). The printed circuit boards include a fence mode PCB 30 for operation with the wireless fence system 12 and a GPS mode PCB 32 for GPS tracking operation in the GPS zone 14. A power connector 31 is located on the fence mode PCB 30. The fence mode PCB 30 and the GPS mode PCB 32 are operatively connected to one another with an inter-PCB connector 33.

The collar operates in fence mode as long as the dog remains within the containment area 22. As discussed herein, "fence mode PCB" and "fence module" are often used interchangeably. However, the fence module technically includes the fence mode PCB 30, antennas 44, a battery pack 40 or 42 with battery power source 45, and collar electrodes 43 (see FIGS. 7-10).

Figure 4:
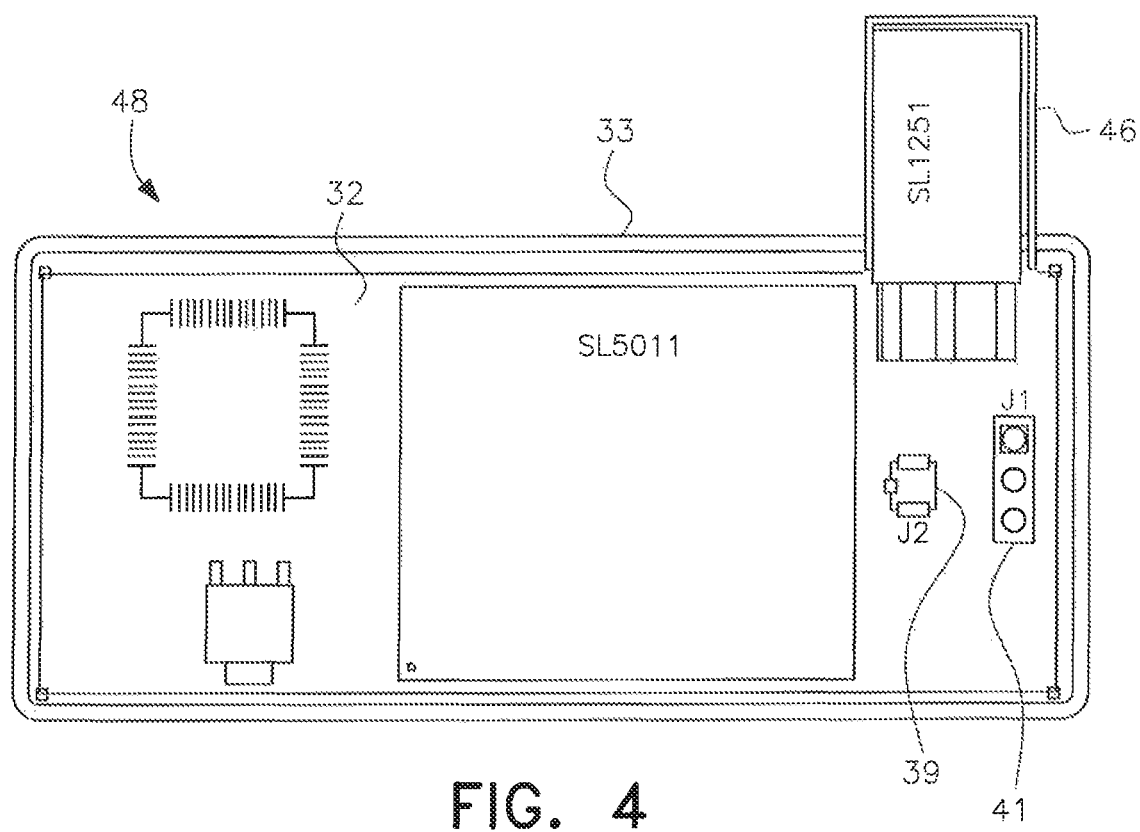
FIG. 4 shows the GPS module in accordance with the present invention.

Should the dog escape the area 22, the fence mode PCB 30 powers up the GPS mode PCB 32 for GPS mode operation as will be discussed more fully hereinafter. The GPS mode PCB 32 is part of a GPS module generally designated by reference numeral 48 that includes the PCB 32 and an external antenna 46, as shown in FIG. 4. The GPS module 48 also includes a battery pack 40 or 42 with battery power source 45. In the embodiment shown, the PCB 32 utilizes a wireless radio with an integral GPS receiver (not shown). Mounting of the antenna 46 external to the enclosure 33 containing the PCB 32 ensures good communication capability and also provides adequate distance between the PCB and the antenna to avoid interference.

Figure 5:
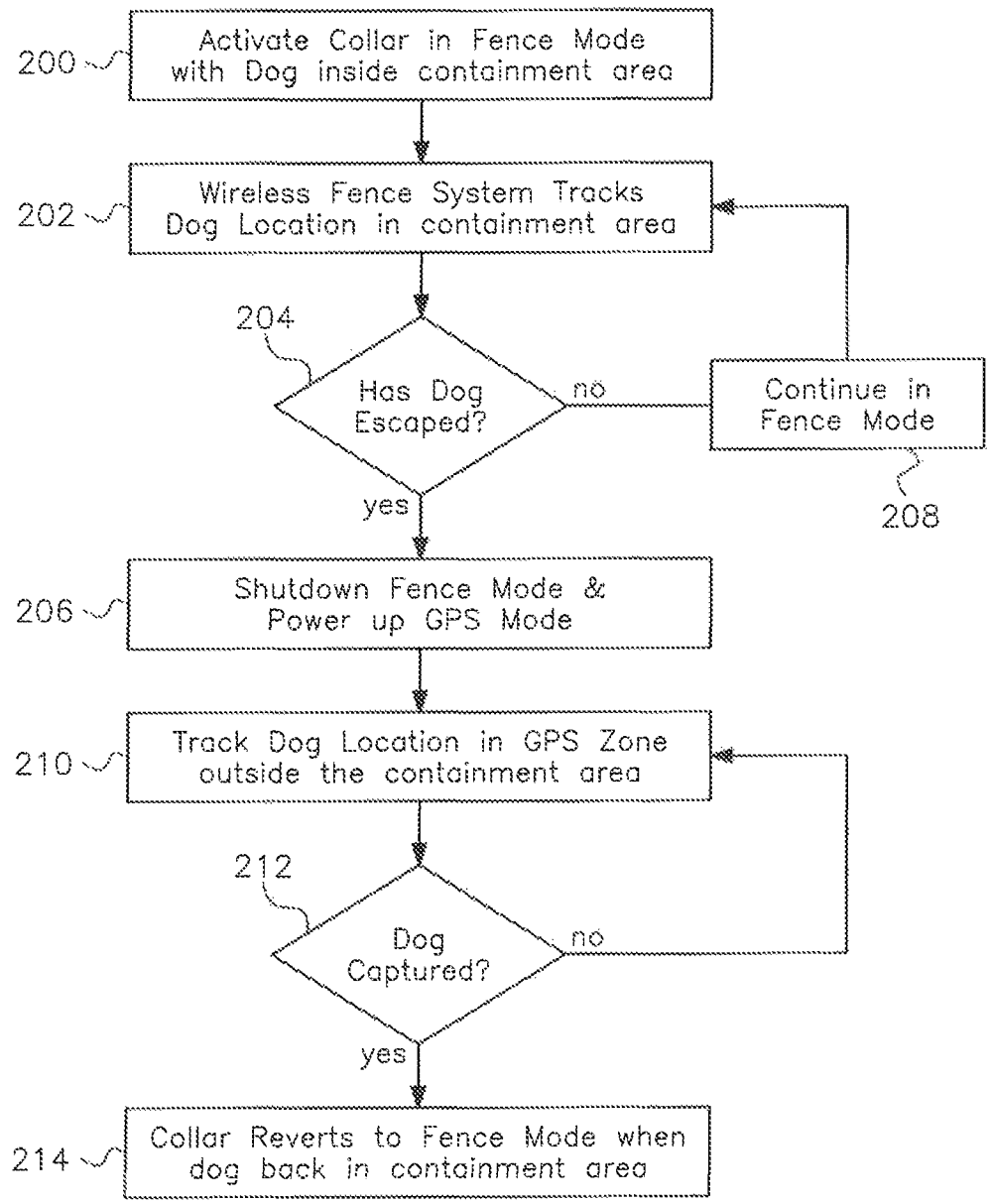
FIG. 5 is a flow chart of the operation of an integrated apparatus and method of operation for a collar that has both wireless fence containment and GPS location modes in accordance with the present invention.

As shown in the flowchart of FIG. 5, the collar is first activated by the user in fence mode and used to contain the dog within the containment area 22 defined by the fence 16, step 200. When the fence module 30 is active and the collar is operating in fence mode, the GPS module 48 is inactive and the transmitters of the wireless fence system operate with the collar to track the dog's location within the containment area 22, step 202. As long as the dog remains within the containment area 22, i.e., has not escaped, step 204, the collar continues to operate in fence mode, step 208. If the dog escapes the containment area, step 204, the GPS module is powered up, step 106, and the fence module shuts down.

Once the GPS module has been powered up, step 206, the user tracks the dog/collar in the GPS zone outside the containment area, step 210. As long as the dog is loose and has not been caught, step 212, the collar remains in GPS mode to track the dog's location, step 210. Once the dog is caught and returned to the containment area, the collar reactivates the fence module and reverts to fence mode operation, step 214.

When in GPS mode, the GPS module 48 in the dog collar uses cell phone technology in conjunction with the GPS to track the dog's location and display it in nearly real time on a smart device 24 such as a computer, tablet, cell phone, etc. that is used by the user 26 to see the dog's location as determined using GPS coordinates as is known to those skilled in the art. The cell phone technology may be CDMA, GSM or the like. Display of the dog's location may be effected using a commercial mapping service such as a version of Google Maps or similar mapping application known to those skilled in the art.

The collar is configured to activate the GPS module and switch from fence mode operation to GPS mode operation under certain circumstances, one of which is a boundary breach. According to one embodiment, a "breach" signal is generated when the dog goes outside of or breaches the fence boundary. The breach signal initiates a timer in the fence operation firmware that defines a boundary breach timeout. The boundary breach timeout can be set for any desired time period, such as 30 seconds, for example. During the timeout period, the collar first administers an audible signal that lasts from between about two and six seconds, and preferably between about two and three seconds, followed by a series of repetitive pulse correction signals delivered by the collar electrodes 43. These signals are intended to cause the dog to return to the containment area. The signal sequence may be repeated one or more times until the timeout timer expires.

If the dog returns to the containment area 22 before the boundary breach timeout expires, the collar resets and resumes normal wireless fence mode operation using the fence module. If the dog does not return to the containment area before the timeout expires, however, expiration of the timeout causes the fence mode PCB 30 to wake up the GPS mode PCB 32 in the GPS module, activating the GPS circuitry to begin tracking the dog's location. The collar will not reset to fence mode operation until after the dog has returned to the containment area.

When the GPS module has determined that the position of the dog is at or beyond a set distance from the containment area, the GPS mode PCB sends a "sleep request" signal to the fence mode PCB. The fence mode PCB, if no longer in communication with the transmitters of the wireless fence system, will act on the "sleep request" signal and enter a deep sleep state to conserve battery power. The collar's operation in wireless fence mode is thus suspended while the collar operates in GPS mode. A similar battery-conserving sleep state may be initiated when the dog is inactive in order to conserve battery power; in deep sleep mode, the microprocessor is still powered on, but at a very low level.

GPS tracking mode operation will continue as long as the dog remains outside of the containment area 22. If/when the dog's location is determined by the GPS module to be within a set distance from the containment area, the GPS mode PCB 32 will deactivate the "sleep request" signal. Upon deactivation of the "sleep request" signal, the fence mode PCB 30 wakes up and attempts to reestablish communications with the transmitters of the wireless fence system. The GPS module continues operating in GPS mode until the dog has returned to a location inside the containment area, as determined by the fence mode PCB through the reestablishment of communication with the transmitters of the wireless fence system. Once the dog's location within the containment area has been identified by the fence module, the fence mode PCB 30 shuts down the GPS module and resumes normal wireless fence mode operation. Hence, the GPS module 48 is not active when the dog is inside the fence boundary.

In addition to activation upon boundary breach, the GPS module is also activated when the collar fails to receive a specified number of "polling" packets from the base transmitter of the wireless fence system, or fails to receive a polling packet for a predetermined time period, indicating a loss of communication with the base. When activated as a result of communication loss, the GPS module operates in a manner that is functionally equivalent to that induced by a boundary breach timeout as described above.

Figure 6:
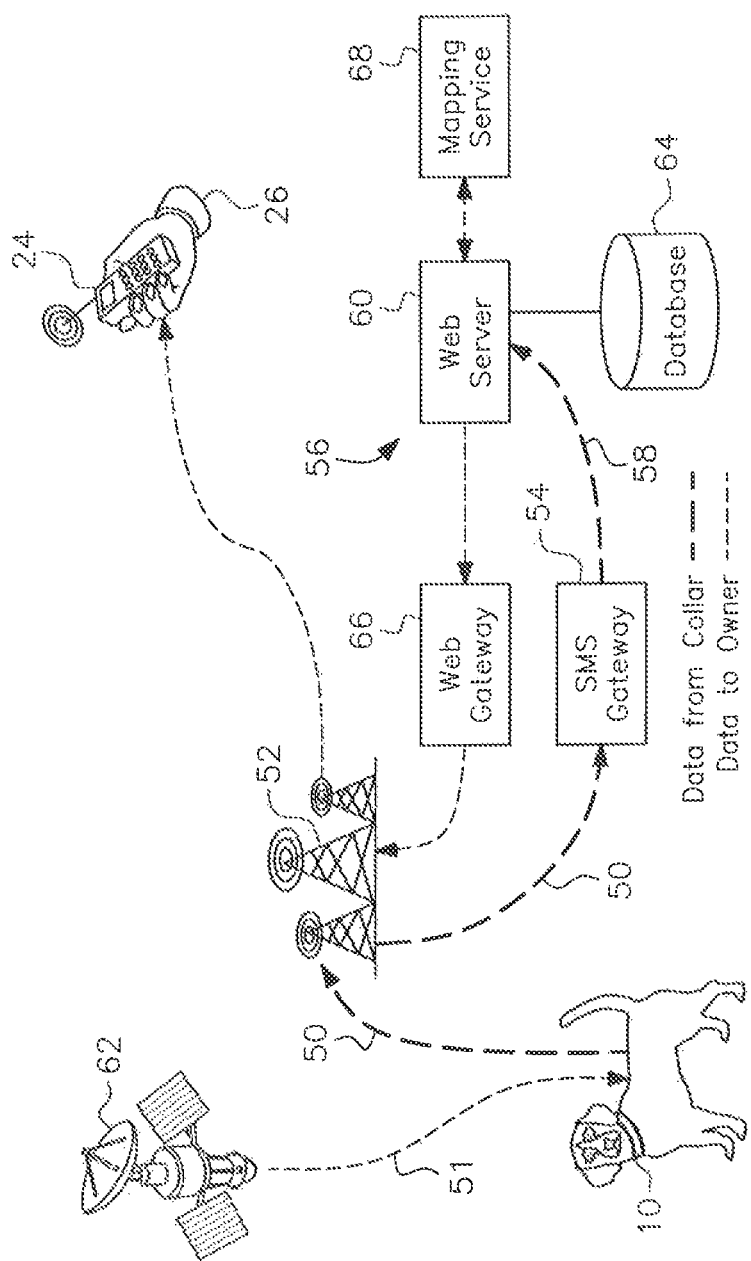
FIG. 6 shows the GPS tracking capability of the collar of the present invention as integrated with the cellular network and Internet infrastructure that supports locating and reporting of the dog's location using SMS messages and/or email to a smart device.
Figure 7:
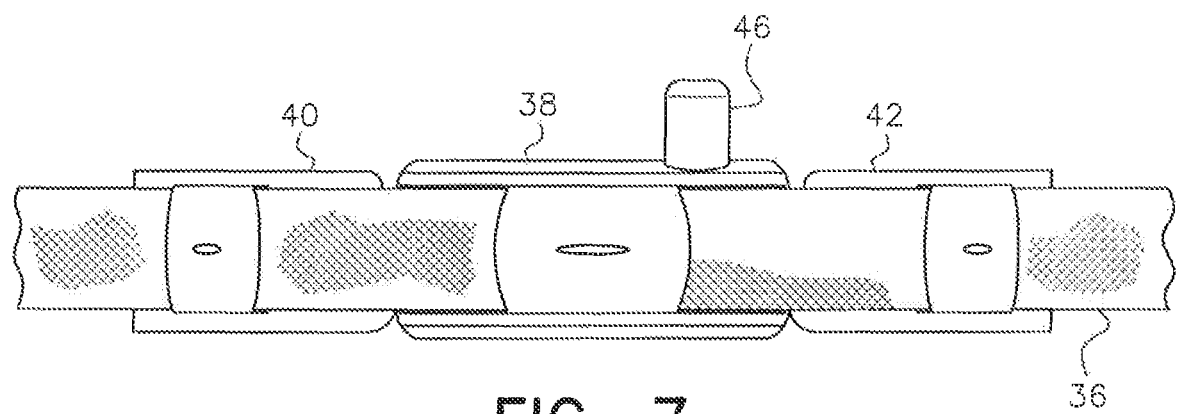
FIG. 7 is an assembled view of a collar according to the present invention from the outer side.
Figure 8A:
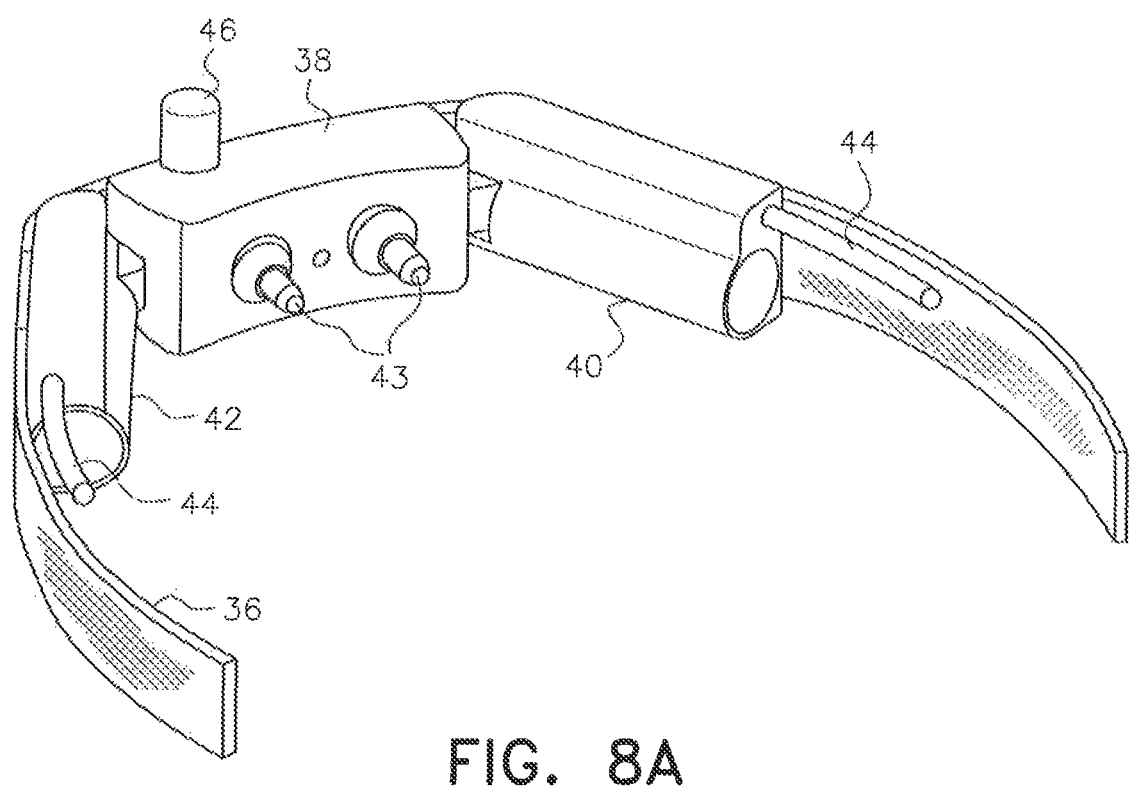
FIG. 8A is an inner perspective view of the assembled collar shown in FIG. 7.
Figure 8B:
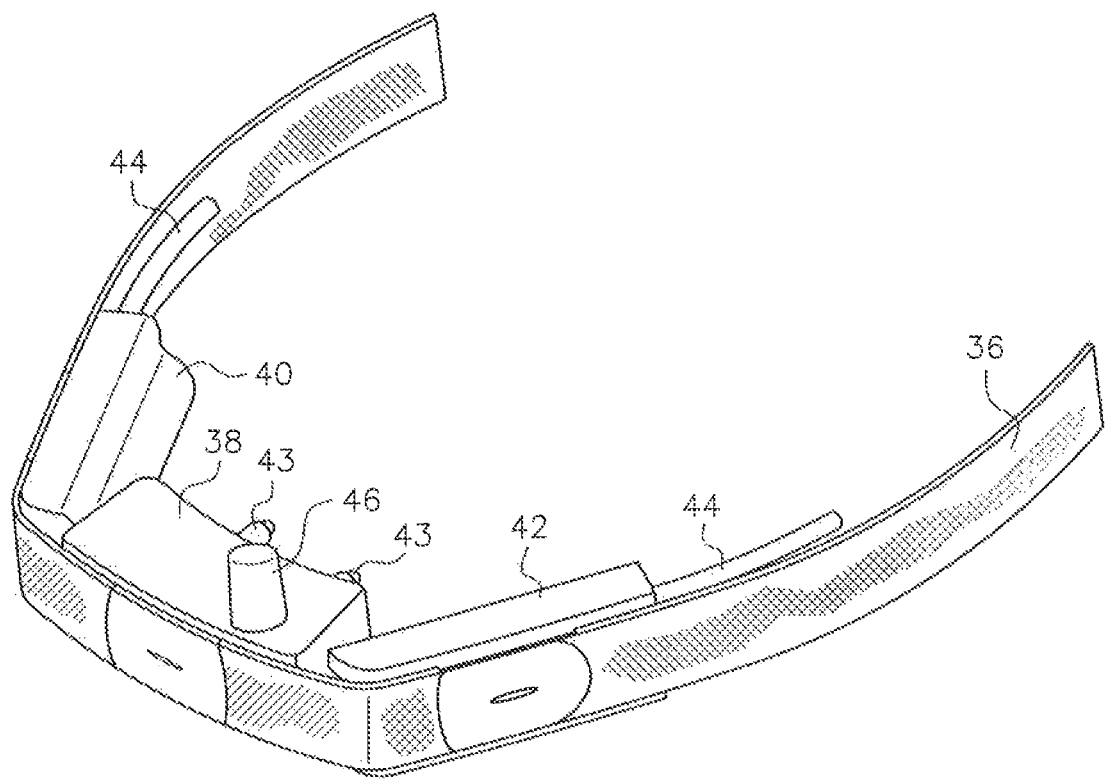
FIG. 8B is an outer perspective view of the assembled collar shown in FIGS. 7 and 8A.
Figure 9A:
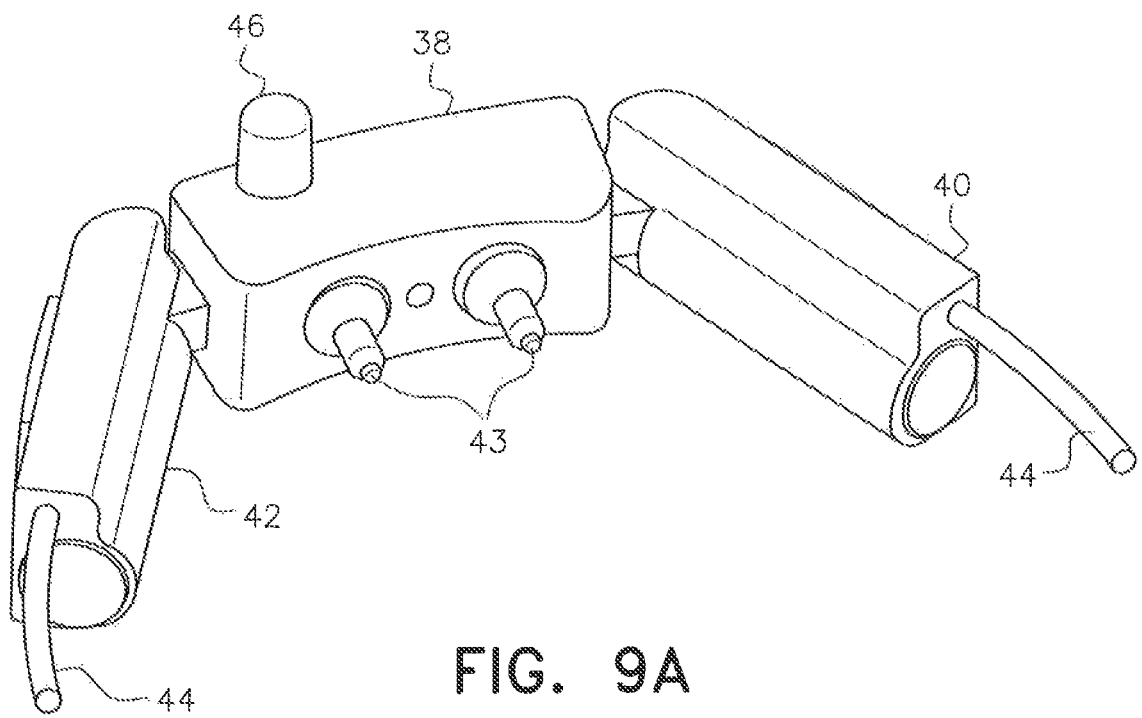
FIG. 9A is an inner perspective view of the collar components shown in FIGS. 1, 8A and 8B without the strap that is used to secure the collar around the dog's neck.
Figure 9B:
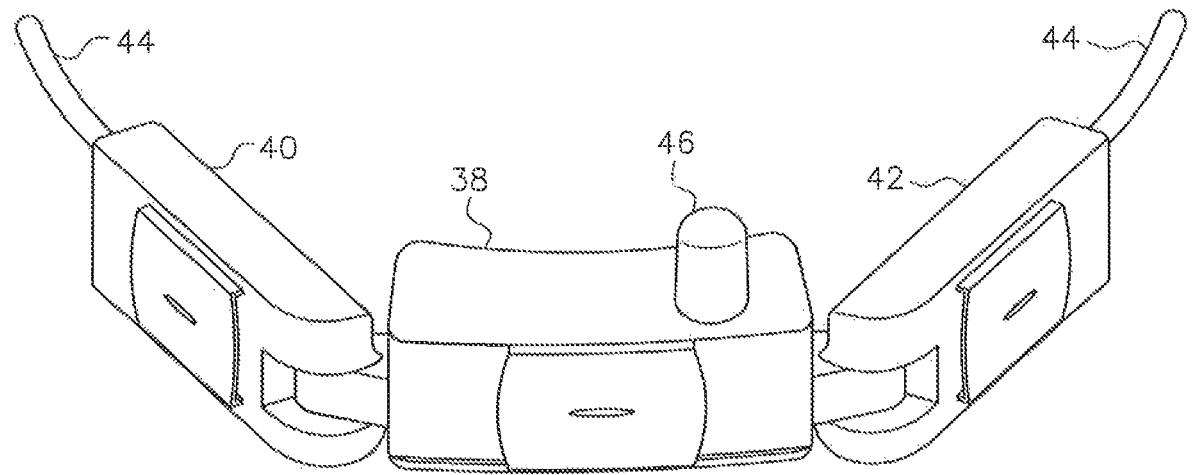
FIG. 9B is an cuter perspective view of the collar components shown in FIG. 9A.

FIG. 6 depicts the infrastructure that supports the GPS dog tracking capability of the present invention. Upon activation, the GPS module 48 periodically transmits data on the dog's location using Short Message Service (SMS) messages. The SMS messages 50 from the dog collar 10 are relayed via a cell phone network 52 to a SMS gateway 54. The messages 50 include GPS coordinates 51 provided to the collar 10 by a GPS satellite 62. Once the SMS message 50 is on the cell phone network 52, the message is routed to the Internet 56 using the SMS gateway 54. A third party service provider is typically relied upon for the SMS gateway 54 because the gateway requires access to the cellular network 52.

The SMS gateway 54 converts the SMS message 50 to a HTTP request 58 and forwards it to the web server 60. The web server 60 receives HTTP requests containing GPS coordinates and other pertinent data from the collar 10. The data received from the collar is stored in a database 64 on the server and provided to the user 26 via a web gateway 66. Alternatively, SMS messages containing dog location status information may be received by the user directly from the collar, i.e., without going through the Internet, using the cellular network to transmit the signal.

When the user 26 logs onto the web server 60 to view the dog's location, the data held in the database 64 is retrieved. The web server 60 communicates with the user via SMS messages and/or email. According to one embodiment, a request is sent to a mapping service 68 such as Google, Bing, Yahoo and Mapquest, among others, to obtain an image that includes the dog's current location. This image is combined with a series of points to indicate the trail the dog has recently followed, along with status information and is displayed on the web browser of the owner's mobile device 24. Use of a mapping service 68 with images is not required, but is preferred for presentation clarity of the dog location information.

As is known in the art, SMS is a text messaging service component of phone, web and/or mobile communications systems, and uses standardized communications protocols to allow fixed line or mobile phone devices to exchange short text messages. The term "SMS" is used herein for both the user activity and all types of short text messaging in many parts of the world. Though most SMS messages are mobile-to-mobile text messages, support for the SMS message service has expanded to include other mobile technologies, with further expansion likely as new services are developed. Therefore, it is understood that the scope of the present invention is intended to include all current and future messaging technologies.

FIGS. 7-10 illustrate one version of the collar used within the apparatus and method of the present invention to provide both wireless fence containment and GPS location capabilities. As shown, the collar includes a strap 36, a control unit 38, two battery cases 40, 42 and antennas 44. Antennas 44 communicate with the transmitters 20 when the fence mode PCB 30 is active during wireless fence mode operation of the collar. Antenna 46 is part of the GPS module 48 as already described herein.

Accordingly, the present invention provides an integrated apparatus and method for containing and tracking a dog's location using a collar that provides two functionalities, the first enabling the user to locate the dog within the containment area of a wireless fence system, and the second allowing the user to find the dog using GPS technology should the dog escape the containment area.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:
1. A method comprising,
monitoring communications of at least one transmitter, the monitoring the communications comprising a first state and a second state, the first state comprising receiving one or more communications from the at least one transmitter, the one or more communications including location information of a mobile object, the receiving the one or more communications including using the location information to monitor a position of the mobile object, wherein the monitored position comprises a first location and a second location;
initiating tracking of the mobile object when at least one of the monitored position comprises the second location and the monitored communications comprises the second state, the tracking comprising instructing a tracking component to determine location data of the mobile object, the tracking comprising delivery of power to the tracking component, the tracking comprising transmitting the location data to a communications gateway.

2. The method of claim 1, wherein the second state comprises failure to receive one or more polling packets from the at least one transmitter, wherein the one or more communications comprise the one or more polling packets.

3. The method of claim 1, ceasing the tracking of the mobile object when the monitored position comprises the first location.

4. The method of claim 3, the ceasing the tracking comprising ceasing the delivery of power to the tracking component.

5. The method of claim 1, the initiating the tracking comprising starting a timer defining a timeout period.

6. The method of claim 5, providing one or more audible signals in a proximity to the mobile object during the timeout period.

7. The method of claim 5, providing at least one electrical stimulus to the mobile object during the timeout period.

8. The method of claim 5, the initiating the tracking comprising initiating the tracking upon expiration of the timeout period.

9. The method of claim 1, wherein the location data comprises GPS positional data of the mobile object.

10. The method of claim 1, wherein the first location comprises a location within a boundary.

11. The method of claim 1, wherein the second location comprises a location outside the boundary.

12. A method comprising,
a first component monitoring communications of at least one transmitter, the monitoring the communications comprising a first state and a second state, the first state comprising receiving one or more communications from the at least one transmitter, the one or more communications including location information of a mobile object, the receiving the one or more communications including using the location information to monitor a position of the mobile object, wherein the monitored position comprises a first location and a second location, wherein the first component resides within a housing;
the first component initiating tracking of the mobile object when at least one of the monitored position comprises the second location and the monitored communications comprises the second state, the tracking comprising the first component instructing a second component to determine location data of the mobile object, the tracking comprising the first component instructing delivery of power to the second component, wherein the second component resides within the housing, the tracking comprising the second component transmitting the location data to at least one remote computing device.

13. The method of claim 12, wherein the second state comprises failure to receive one or more polling packets from the at least one transmitter, wherein the one or more communications comprise the one or more polling packets.

14. The method of claim 12, the first component ceasing the tracking of the mobile object when the monitored position comprises the first location.

15. The method of claim 14, the ceasing the tracking comprising the first component instructing cessation of power to the second component.

16. The method of claim 12, the initiating the tracking comprising starting a timer defining a timeout period.

17. The method of claim 16, the first component providing one or more audible signals in a proximity to the mobile object during the timeout period.

18. The method of claim 16, the first component providing at least one electrical stimulus to the mobile object during the timeout period.

19. The method of claim 16, the initiating the tracking including initiating the tracking upon expiration of the timeout period.

20. The method of claim 12, wherein the first component comprises a fence module, wherein the fence module comprises a first power source.

21. The method of claim 12, wherein the second component comprises a GPS module, wherein the GPS module comprises a second power source.

22. The method of claim 12, wherein the first component is electrically coupled to the second component.

23. The method of claim 12, wherein the first component is electrically connected to the second component.

24. The method of claim 12, wherein the location data comprises GPS positional data of the mobile object.

25. The method of claim 12, wherein the first location comprises a location within a boundary.

26. The method of claim 12, wherein the second location comprises a location outside the boundary.

27. A method comprising,
monitoring communications of at least one transmitter, the monitoring the communications comprising a first state and a second state, the first state comprising receiving one or more communications from the at least one transmitter, the one or more communications including location information of a mobile object, the receiving the one or more communications including using the location information to monitor a position of the mobile object, wherein the monitored position comprises a first location and a second location;
initiating tracking of the mobile object when at least one condition is met, wherein the at least one condition includes the monitored position comprising the second location, the tracking comprising instructing a tracking component to determine location data of the mobile object, the tracking comprising delivery of power to the tracking component, the tracking comprising transmitting the location data to a communications gateway;
ceasing the tracking of the mobile object when the monitored position comprises the first location, the ceasing the tracking comprising ceasing delivery of power to the tracking component.

28. The method of claim 27, wherein the at least one condition includes the monitored communications comprising the second state.

29. The method of claim 28, wherein the second state comprises failure to receive one or more polling packets from the at least one transmitter, wherein the one or more communications comprise the one or more polling packets.

* * * * *